United States Patent
Dixon et al.

(10) Patent No.: US 10,810,594 B2
(45) Date of Patent: *Oct. 20, 2020

(54) DELAYED TRANSIT FARE ASSESSMENT

(71) Applicant: VISA U.S.A. INC., San Francisco, CA (US)

(72) Inventors: Philip Dixon, San Diego, CA (US); Ayman Hammad, Pleasanton, CA (US); Khalid El-Awady, Mountain View, CA (US)

(73) Assignee: VISA U.S.A. INC., San Francisco, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/101,195

(22) Filed: Aug. 10, 2018

(65) Prior Publication Data

US 2018/0349907 A1   Dec. 6, 2018

Related U.S. Application Data

(63) Continuation of application No. 11/681,174, filed on Mar. 1, 2007, now Pat. No. 10,055,735.

(Continued)

(51) Int. Cl.
*G06Q 20/34* (2012.01)
*G06Q 20/02* (2012.01)
(Continued)

(52) U.S. Cl.
CPC ....... *G06Q 20/4016* (2013.01); *G06Q 20/027* (2013.01); *G06Q 20/04* (2013.01);
(Continued)

(58) Field of Classification Search
CPC .............................. G06Q 20/40; G06Q 20/02
(Continued)

(56) References Cited

U.S. PATENT DOCUMENTS 5,043,561 A   8/1991   Kimata
5,485,520 A   1/1996   Chaum et al.
(Continued)

FOREIGN PATENT DOCUMENTS

AU   2007345580 B2   7/2013
EP   2108178           10/2009
(Continued)

OTHER PUBLICATIONS

ISO/IEC 7812; http://en.wikipedia.org/wiki/wlindex.php?title=IS0/1EC_7812&oldid=103608433; printed Mar. 8, 2014, uploaded Jan. 27, 2007, 3 pages.

(Continued)

*Primary Examiner* — Hai Tran
(74) *Attorney, Agent, or Firm* — Kilpatrick Townsend & Stockton LLP

(57) ABSTRACT

At each of a plurality of point of sale terminals (POS) of a merchant for each of a plurality of consumers, where each consumer seeks to conduct a transaction with the merchant for a good or service at a cost by using a payment device issued by an issuer in a payment system, data is read from a payment device. The data can include an identifier for an account issued by an issuer, information is stored for each transaction and the consumer is permitted to receive the good or service from the merchant. After the consumer has received the good or service, a batch of the transaction are processed to derive there from the respective costs that are assessable to the respective accounts, where the merchant can be a transit system, the consumer a rider thereon, end the transaction can be access to a facility thereof.

19 Claims, 4 Drawing Sheets

Related U.S. Application Data

(60) Provisional application No. 60/887,307, filed on Jan. 30, 2007.

(51) Int. Cl.

| | | |
|---|---|---|
| *G06Q 20/04* | (2012.01) | |
| *G06Q 20/40* | (2012.01) | |
| *G06Q 20/08* | (2012.01) | |
| *G06Q 20/20* | (2012.01) | |
| *G06Q 20/32* | (2012.01) | |
| *G06Q 20/38* | (2012.01) | |
| *G07B 15/00* | (2011.01) | |

(52) U.S. Cl.
CPC ....... *G06Q 20/085* (2013.01); *G06Q 20/0855* (2013.01); *G06Q 20/20* (2013.01); *G06Q 20/204* (2013.01); *G06Q 20/32* (2013.01); *G06Q 20/327* (2013.01); *G06Q 20/341* (2013.01); *G06Q 20/382* (2013.01); *G06Q 20/3821* (2013.01); *G06Q 20/40* (2013.01); *G06Q 20/401* (2013.01); *G07B 15/00* (2013.01)

(58) Field of Classification Search
USPC .......................................................... 705/35
See application file for complete search history.

(56) References Cited

U.S. PATENT DOCUMENTS

| | | | |
|---|---|---|---|
| 5,801,943 A | 9/1998 | Nasburg | |
| 5,897,621 A | 4/1999 | Boesch et al. | |
| 5,991,749 A | 11/1999 | Morrill, Jr. | |
| 6,097,292 A | 8/2000 | Kelly et al. | |
| 6,185,307 B1 | 2/2001 | Johnson, Jr. | |
| 6,205,433 B1 | 3/2001 | Boesch et al. | |
| 6,577,229 B1 | 6/2003 | Bonneau et al. | |
| 6,609,655 B1 | 8/2003 | Harrell | |
| 6,629,591 B1 | 10/2003 | Griswold et al. | |
| 6,655,587 B2 | 12/2003 | Andrews et al. | |
| 6,792,536 B1 | 9/2004 | Teppler | |
| 7,092,697 B1 | 8/2006 | Kupsh et al. | |
| 7,374,082 B2 | 5/2008 | Van de Velde et al. | |
| 7,566,003 B2 | 7/2009 | Silbernagl et al. | |
| 7,567,920 B2 | 7/2009 | Hammad et al. | |
| 7,568,617 B2 | 8/2009 | Silbernagl et al. | |
| 7,599,522 B2 | 10/2009 | Ito | |
| 7,873,594 B2 | 1/2011 | Harada et al. | |
| 7,992,179 B1 | 8/2011 | Kapner, III et al. | |
| 7,996,271 B2 | 8/2011 | Chan et al. | |
| 8,448,852 B2 | 5/2013 | Dixon et al. | |
| 8,505,816 B2 | 8/2013 | Silbernagl | |
| 8,662,390 B2 | 3/2014 | Silbernagl | |
| 10,055,735 B2 | 8/2018 | Dixon et al. | |
| 2002/0029165 A1* | 3/2002 | Takatori | G07B 15/02 705/13 |
| 2002/0046173 A1 | 4/2002 | Kelly | |
| 2002/0078152 A1 | 6/2002 | Boone | |
| 2002/0128967 A1 | 9/2002 | Meyer et al. | |
| 2002/0145050 A1 | 10/2002 | Jayaratne | |
| 2002/0161729 A1* | 10/2002 | Andrews | G06Q 20/363 705/417 |
| 2003/0036997 A1 | 2/2003 | Dunne | |
| 2003/0080186 A1 | 5/2003 | McDonald et al. | |
| 2003/0229590 A1 | 12/2003 | Byrne et al. | |
| 2004/0039697 A1 | 2/2004 | Vilmos | |
| 2004/0054622 A1 | 3/2004 | Strayer et al. | |
| 2004/0103057 A1 | 5/2004 | Melbert et al. | |
| 2004/0193460 A1 | 9/2004 | Ducholet et al. | |
| 2004/0210476 A1 | 10/2004 | Blair et al. | |
| 2004/0210498 A1 | 10/2004 | Freund | |
| 2004/0236646 A1 | 11/2004 | Wu et al. | |
| 2005/0103839 A1 | 5/2005 | Hewel | |
| 2005/0109838 A1 | 5/2005 | Linlor | |
| 2005/0121511 A1 | 6/2005 | Robbins et al. | |
| 2005/0192815 A1 | 9/2005 | Clyde | |
| 2005/0234778 A1 | 10/2005 | Sperduti et al. | |
| 2005/0289231 A1 | 12/2005 | Harada et al. | |
| 2006/0163345 A1 | 7/2006 | Myers et al. | |
| 2006/0178986 A1 | 8/2006 | Giordano et al. | |
| 2006/0224470 A1 | 10/2006 | Garcia Ruano et al. | |
| 2006/0253581 A1 | 11/2006 | Dixon et al. | |
| 2006/0278704 A1* | 12/2006 | Saunders | G06Q 20/10 235/382 |
| 2007/0075140 A1 | 4/2007 | Guez et al. | |
| 2007/0078782 A1 | 4/2007 | Ono et al. | |
| 2007/0131761 A1 | 6/2007 | Smets et al. | |
| 2007/0179859 A1 | 8/2007 | Chan et al. | |
| 2007/0233615 A1 | 10/2007 | Tumminaro | |
| 2008/0040274 A1 | 2/2008 | Uzo | |
| 2008/0128513 A1 | 6/2008 | Hammad et al. | |
| 2008/0135612 A1 | 6/2008 | Silbernagl et al. | |
| 2008/0140516 A1 | 6/2008 | Silbernagl et al. | |
| 2008/0183565 A1 | 7/2008 | Dixon et al. | |
| 2008/0242355 A1 | 10/2008 | Yu et al. | |
| 2009/0076650 A1 | 3/2009 | Faes | |
| 2009/0094126 A1 | 4/2009 | Killian et al. | |
| 2009/0283591 A1 | 11/2009 | Silbernagl | |
| 2011/0087630 A1 | 4/2011 | Harada et al. | |
| 2011/0246319 A1 | 10/2011 | Chan et al. | |
| 2011/0250866 A1 | 10/2011 | Fisher | |
| 2013/0030883 A1 | 1/2013 | Silbernagl | |
| 2013/0325566 A1 | 12/2013 | Silbernagl | |

FOREIGN PATENT DOCUMENTS

| | | |
|---|---|---|
| JP | 10-18808 | 7/1998 |
| JP | 2003-058919 A | 2/2003 |
| KR | 10-2000-0036786 A | 7/2000 |
| KR | 10-2004-0005989 A | 1/2004 |
| KR | 10-2005-0005738 A | 1/2005 |
| WO | 2000/16255 A1 | 3/2000 |
| WO | 2006/124808 A2 | 11/2006 |
| WO | 2008/094324 | 8/2008 |

OTHER PUBLICATIONS

"*Smart Systems Innovations LLC. vs. Chicago Transit Authority*", Federal Circuit Case, 2016-1233, Oct. 18, 2017, 37 pages.

Advisory Action dated Feb. 16, 2017 for U.S. Appl. No. 11/681,174, 5 pages.

Final Office Action dated Jan. 18, 2018 for U.S. Appl. No. 11/681,174, 21 pages.

Final Office Action dated Jun. 12, 2015 for U.S. Appl. No. 11/681,174, 21 pages.

Final Office Action dated Nov. 9, 2016 for U.S. Appl. No. 11/681,174, 22 pages.

Final Office Action dated Oct. 19, 2009 for U.S. Appl. No. 11/681,174, 22 pages.

Final Office Action dated Mar. 14, 2011 for U.S. Appl. No. 11/681,174, 9 pages.

Non-Final Office Action dated Aug. 13, 2014 for U.S. Appl. No. 11/681,174, 14 pages.

Non-Final Office Action dated Aug. 8, 2017 for U.S. Appl. No. 11/681,174, 21 pages.

Non-Final Office Action dated Nov. 21, 2008 for U.S. Appl. No. 11/681,174, 22 pages.

Non-Final Office Action dated May 14, 2010 for U.S. Appl. No. 11/681,174, 23 pages.

Non-Final Office Action dated May 4, 2016 for U.S. Appl. No. 11/681,174, 23 pages.

Notice of Allowance dated Apr. 20, 2018 for U.S. Appl. No. 11/681,174, 10 pages.

Final Office Action dated Apr. 19, 2011 for U.S. Appl. No. 11/681,176, 13 pages.

Non-Final Office Action dated Jun. 5, 2012 in U.S. Appl. No. 12/883,919, 17 pages.

Notice of Allowance dated Nov. 29, 2012 in U.S. Appl. No. 12/883,919, 16 pages.

(56) References Cited

OTHER PUBLICATIONS

Final Office Action dated Jul. 25, 2013 in U.S. Appl. No. 13/564,625, 13 pages.
Non-Final Office Action dated Dec. 19, 2012 in U.S. Appl. No. 13/564,625, 13 pages.
Non-Final Office Action dated Mar. 24, 2014 in U.S. Appl. No. 13/564,625, 13 pages.
Notice of Allowance dated Oct. 31, 2014, for U.S. Appl. No. 13/564,625, 8 pages.
Final Office Action dated Mar. 6, 2014 in U.S. Appl. No. 13/776,421, 12 pages.
Non-Final Office Action dated Nov. 18, 2013 in U.S. Appl. No. 13/776,421, 15 pages.
Non-Final Office Action dated Oct. 10, 2013 in U.S. Appl. No. 13/872,637, 6 pages.
Notice of Allowance dated Dec. 16, 2013 in U.S. Appl. No. 13/872,637, 11 pages.
Notice of Office Action dated Sep. 10, 2014 for Korean Patent Application No. 10-2009-7017975, 8 pages (with translation).
Notice of Office Action dated Sep. 10, 2014 for Korean Patent Application No. 10-2009-7017982, 11 pages (with translation).
Office Action (English Translation) dated Feb. 12, 2015 in Korean Patent Application No. 10-2009-7017982, 10 pages.
Nationmaster.com http://www.statemaster.com/encyclopedia/Mybi. Retrieved online May 10, 2010, copyright 2003-2005, 2 pages.
"International Preliminary Report on Patentability" dated Aug. 4, 2009 for PCT Application No. PCT/US2007/082842, 5 pages.

* cited by examiner

DELAYED TRANSIT FARE ASSESSMENT

CROSS-REFERENCE TO RELATED APPLICATION

This application is a continuation of the U.S. application Ser. No. 11/681,174, filed Mar. 1, 2007, titled "Delayed Transit Fare Assessment," which claims priority to U.S. Provisional Application Ser. No. 60/887,307, filed on Jan. 30, 2007, titled "Contactless Bank Card Transit Payment", which are incorporated herein by reference in their entirety.

BACKGROUND

The present invention relates generally to financial transactions, particularly to customers requesting financial transactions with merchants, and more particularly to financial transactions conducted with a financial institution portable payment device issued by a financial institution, such as a credit card that, that may be used both in a retail transaction and in a transit fare transaction.

Portable payment devices can take many forms and are used in a great variety of financial transactions. The portable payment devices can comprise, for example, smart cards, payment tokens, credit cards, debit cards, stored value cards, pre-paid cards contactless cards, cellular telephones, Personal Digital Assistant (PDA) devices, key fobs, or smart cards. The financial transactions can involve, for example, retail purchases, transit fares, access to venue fares, etc. in all such transactions, the portable payment device users (consumers) are concerned with convergence and the merchants with whom they deal are concerned with ease of transacting with their customer-consumers.

Preferably, financial institution portable payment devices issued by a financial institution (FIPPD) are used in an on-line fashion (e.g., a point of service that is connected to a payment processing system during a transaction). The information from the FIPPD may be transmitted on-line to an issuer during a retail payment transaction for purposes of authorizing the use of the FIPPD for that transaction. The issuer may review parameters of the transaction such as transaction amount, credit history, card authenticity, and other factors when determining whether or not to authorize or decline the transaction.

However, some merchant transactions are not on-line such that FIPPD authentication and verification schemes are not readily accommodated. For example, the ability to go on-line in a transit environment such as a subway or bus system, or a venue access environment such as a stadium or concert hall, may be problematic because of the lack of real time communication and lack of network systems for such environments. This is due in part to the need in such environments to process a transaction within about 300 ms, a transit system industry standard, and thereby allow 30 to 45 patrons per minute access into a facility of the transit system such as a subway or a bus. Moreover, a bus on an over-the-road bus route may not have wireless or other communication systems to allow any real-time dialogue with any other systems outside of the bus, such as for on-line fare assessment or on-line admission ticket/voucher/card authorization. Therefore this absence of network connectivity in a transit environment presents a difficulty whenever an on-line authentication of the consumer's means of access, such as an admission ticket, voucher, or access card, is necessary in order to determine whether, for instance, the consumer is entitled to access and has sufficient funds to cover the cost of the desired transaction (fare for riding on the transit system).

Moreover, in a transit environment, the value of the transit fare may not be known at the time of requested access. A fare calculation may depend upon the actual travel distance, direction of travel, station entry and exit locations, mode of travel (subway, bus, water taxi), consumer category (student, senior), and/or times of use (peak, off-peak). Such parameters may be unknown prior to rendering the service. As such, the transit fare payment and collection process cannot be performed effectively using a conventional on-line authentication and approval process.

Traditionally, transit fare calculation and collection have occurred in a closed system. In a closed system, the transit company may issue its own transit portable payment, device, such as a read/write smart card, wherein the transit, portable payment device carries the necessary credentials and data to allow completion of a transaction at the fare device itself (turnstile, fare box, or other Point of Service). In this case, there is no additional processing required for fare determination at the time of the transaction outside of the interaction between the card and the fare device. Rather, the card is authenticated and read by the fare device, logic is performed by the fare device to apply transit system fare policy, and the card is updated (rewritten) to finalize the transaction details including a deduction of any stored value for the cost of fare. The fare device may additionally query a white list, a positive list, a hot list, a negative list and/or a black list utilizing the card number, for example, to determine whether the transaction will be completed and the cardholder will be avowed access into a facility of the transit system such as a subway terminal or bus passenger compartment.

The closed transit system, however, has its drawbacks. In a closed transit system, the transit portable payment device and transit readers at each station or route must be able to perform fare computations based on data stored and retrieved from a rider's access card, and subsequent card terminals/readers must be able to access data written to the rider's access card at previous stations. This requirement places a significant processing burden on the transit system terminals and/or fare processing systems and increases the cost of implementing the infrastructure for such systems. As fare rates and other relevant information generally change over time, this also increases the demands placed upon such systems for maintenance of accuracy.

Moreover, one transit portable payment device may not be compatible with all of the fare devices within a rider's travel plan. This can become a significant problem if a consumer wishes to utilize more than one transit system during a day's commute, such as by using multiple transit agencies or venues within a single geographical area that provide ridership both in and among different jurisdictions, cities or locations.

The present transit environment presents several challenges, including:
  A common necessity that there can be only one transit portable payment device for each transit agency or group of cooperating agencies that cannot be used for other such agencies or groups;
  The desire to accommodate transit system user's transaction speed expectations while minimizing risk to the transit agency for collecting payment for services rendered; and
  When a portable payment device is 'read-only,' not having write capabilities at the Point of Service, the Portable Payment devices cannot store the rider's transit chronology data—thus making the rider's fare calculations somewhat difficult with such devices. With such off-line transactions, a list (i.e., a white list of eligible cards or a negative list of rejected cards based on the unique card number) stored at each transit fare device is the primary mechanism to deter fraud. This is sub-optimal since the negative list would presumably grow unbounded as more FIPPD are issued.

In addition to the transit system rider's desire for a fast transaction speed when accessing a transit system facility, there are security and other risks associated with the use of a FIPPD that is designed for on-line authorization when it is otherwise used in an off-line transaction. These risks include, but are not limited to:

Authentication/Fraud: the lack of FIPPD authentication in real time creates a nigh potential for fraud through counterfeiting techniques;

Fare Cost Calculation: where the cost of a transit transaction is dependent upon the immediate rider history for the card (entry/exit/length of travel, transfers, etc.), the rider's transit fare cannot be calculated at each gate or fare box because the rider's immediate history of travel cannot be stored, written or resident on conventional FIPPDs;

Data Security/Storage: protection of consumer data in a transit fare system may prove difficult. Tracking data in the form of a primary account number (PAN) for a FIPPD would require the transit system to collect and store this data securely, which is not something transit fare systems commonly do presently. If implemented, this requirement presents added cost and security concerns to both the transit system and its riders; and What is needed in the art is the payment and collection of transactions utilizing a FIDDP device within the above environments, including access fares to transit systems and venues, that overcome the challenges and disadvantages of the prior art.

SUMMARY

A payment transaction can be conducted in a combined scheme utilizing a financial institution portable payment device (FIPPD). During a consumer's transaction with a merchant for a good or service, information from the FIPPD can be read at a point of service (POS) terminal. The consumer with the FIPPD receives the good or service associated with the transaction. After the consumer has received the good or service, the transaction value can be calculated, such as at a central server, based on predetermined rules and/or policies. Once calculated, the transaction value may be transmitted to a payment processing system, such as a credit card payment system, so that the merchant can collect the calculated transaction value from one or more members of the payment processing system.

In one implementation, a consumer can seek to conduct a transaction with a merchant for a good, service, or a combination thereof at a POS terminal using a FIPPD associated with an account within a payment processing system. The POS may have a reader, such as a contactless card reader, that collects data from a data storage region of the FIPPD, including the FIPPD's account information. The data in the storage region of the FIPPD, along with other transaction information such as the time of day and POS location, after retrieving the same can then be stored at a location different from the POS. The consumer using the FIPPD for the transaction is then permitted to receive the good or service from the merchant prior to a calculation of the cost thereof. After the consumer receives the good or service, the transaction cost can be derived and then assessed to the account associated with the FIPPD.

In another implementation, a consumer (rider) may seek access into a transit facility at a transit POS terminal using a FIPPD associated with an account within a payment processing system. The transit POS may have a reader, such as a contactless card reader, that collects data from a data storage region of the FIPPD, including the FIPPD's account information. The data in the storage region of the FIPPD, along with other transaction information such as the time of day and transit POS location, after retrieving the same, can then be stored at a location different from the transit POS. The rider using the FIPPD for the transit transaction is then permitted to access the transit facility prior to a calculation of a fare for riding the transit system. After the rider accesses the transit facility, the fare can be derived from stored rider transaction history data and assessed to the account associated with the FIPPD.

BRIEF DESCRIPTION OF THE DRAWINGS

The subject invention will be described in the context of the appended drawing figures, where the same numbers are used throughout the disclosure and figures to reference like components and features.

DETAILED DESCRIPTION

Figure 1:
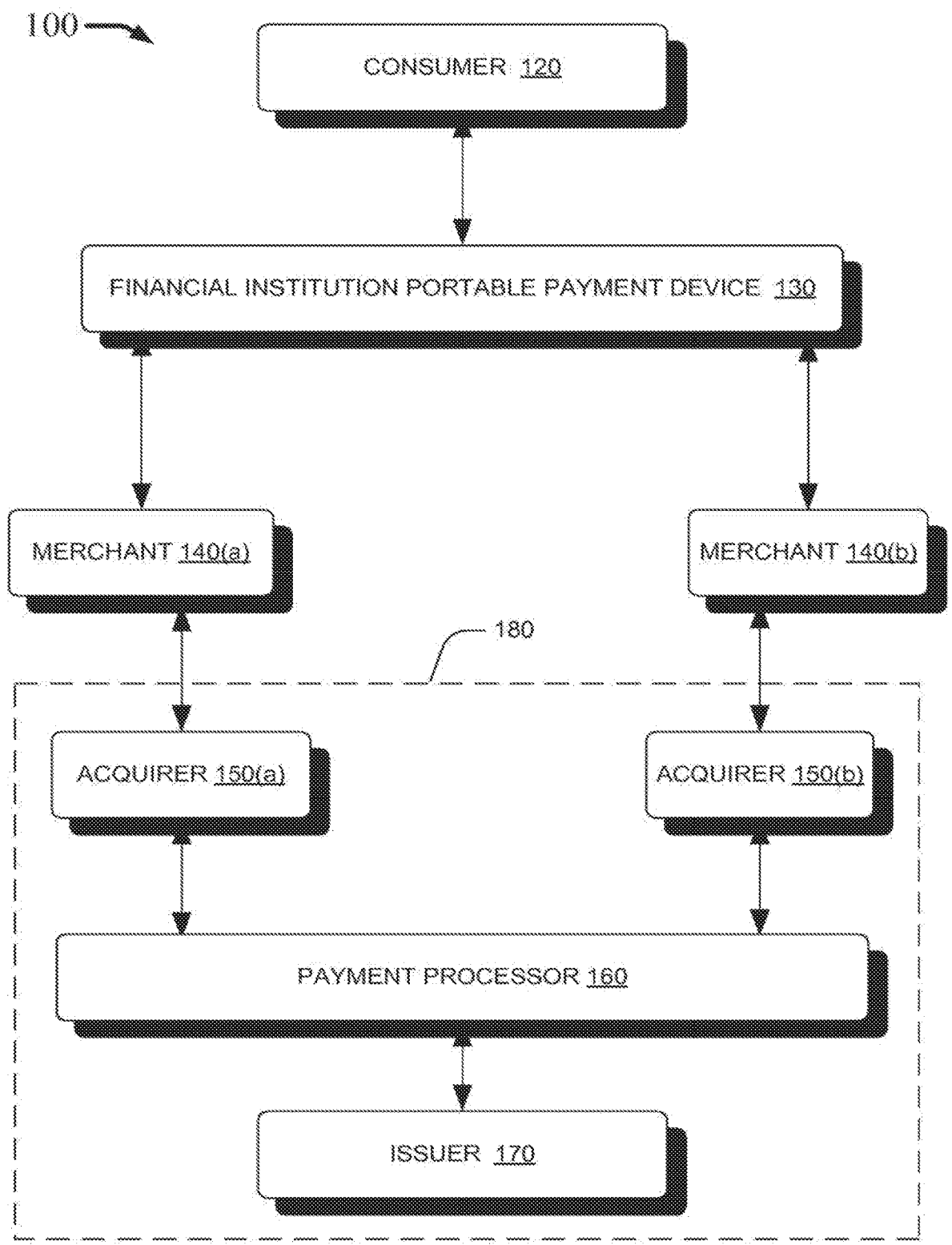
FIG. 1 is a block level diagram illustrating an exemplary payment processing system.

Implementations facilitate the payment and collection of transactions using a financial institution portable payment device (FIPPD) such as a contactless card or a smart chip embedded in a mobile device such as a cellular telephone. The transaction value of each transaction may not be known at the time that a consumer in the transaction receives from a merchant one or more goods or services associated with the transaction Mechanisms are provided to curb fraud through the use of a negative list system (e.g.; a list of invalid account numbers) sometimes referred to as "black list" or "hot list", and/or through the use of a white or "positive" list system (e.g.; a list of valid account numbers).

As used herein, a FIPPD is intended to be broadly understood as being a portable payment device associated with an account within a payment system. The account may be a credit account, a debit account, a stored value account (e.g., a pre-paid account, an account accessible with a gift card, an account accessible with a reloadable card). As such, the FIPPD may be a (handheld) device such a cellular telephone, a MP3 player, a Personal Digital Assistant (PDA), a key fob, a mini-card, a keychain device (such as the Speedpass™ commercially available from Exxon-Mobil Corp.), a proximity contactless payment device such as one that complies with the International Organization for Standardization (ISO) 14443, a substrate bearing an optically scannable data region, a smart card, or integral and/or accessorized elements rendering the same functional equivalent of and to a contactless bank card associated with a payment system. A contactless payment device is a device that incorporates a means of communicating with a portable payment device reader or terminal without the need for direct contact. Thus, such portable payment devices may effectively be presented in the proximity of a portable payment device reader or terminal. A smart chip is a semiconductor device that is capable of performing most, if not all, of the functions of a smart card, but may be embedded in another device. Such contactless devices typically communicate with the portable payment device reader or terminal using RF (radio-frequency) technology, wherein proximity to an antenna causes data transfer between the portable payment device and the reader or terminal.

Typically, an electronic payment transaction is authenticated if the consumer conducting the transaction is properly authorized and has sufficient funds or credit to conduct the transaction. Conversely, if there are insufficient funds or credit in the consumer's account, or if the consumer's portable payment device is reported as lost or stolen, then an electronic payment transaction may not be authorized. In the following description, an "acquirer" is typically a business entity (e.g., a commercial bank) that has a business relationship with a particular merchant. An "issuer" is typically a business entity (e.g., a bank) which issues a portable payment device such as a credit, debit, or stored value card to a consumer. Some entities may perform both issuer and acquirer functions.

In standard operation, an issuer validation (e.g., authorization) request message is created during a consumer purchase of a good or service at a Point Of Service (POS). The issuer validation request message can be sent from the POS terminal located at a merchant to the merchant's acquirer, to a payment processing system, and then to an issuer. An "issuer validation request message" can include a request for issuer validation to conduct an electronic payment transaction. It may include one or more of an account holder's payment account number, currency code, sale amount, merchant transaction stamp, acceptor city, acceptor state/country, etc. An issuer validation request message may be protected using a secure encryption method (e.g., 128-bit SSL or equivalent) in order to prevent data from being compromised.

Referring to FIG. 1, one implementation of a payment system 100 compatible with a FIPPD is illustrated. The payment system 100 includes, a plurality of merchants 140 associated with one or more acquirers 150, and issuers 170. Each merchant 140 may have one or more merchant locations 140(a), 140(b) with acquirers 150(a) and 150(b) associated with those merchant locations, where 'a' can be a value from 1 to 'A' and 'b' can be a value from 1 to 'B'. The different merchant locations 140(a), 140(b) may be affiliated with a single merchant. A consumer 120 may purchase a good or service at the merchant locations 140(a), 140(b) using a FIPPD 130. The acquirers 150(a), 150(b) can communicate with an issuer 170 via a payment processor 160.

The FIPPD 130 may be in many suitable forms. As stated previously, the FIPPD 130 can be a mobile device that incorporates a contactless element such as a chip for storing payment data (e.g., a BIN number, account number, etc.) and a wireless data transfer (e.g., transmission) element such as an antenna, a light emitting diode, a laser, a near field communication component, etc. The FIPPD 130 may also be used to perform debit functions (e.g., a debit card), credit functions (e.g., a credit card), or stored value functions (e.g., a stored value card).

The payment processor 160 may include data processing subsystems, networks, and other means of implementing operations used to support and deliver issuer validation services, exception file services, and clearing and settlement services for payment transactions. The acquirer 150, payment processor 160, and the issuer 170 make up a payment processing system 180.

The payment processor 160 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processor 160 may use any suitable wired or wireless network, including the Internet.

The merchant 140 typically has a point of sale (POS) terminal (not shown) that can interact with the FIPPD 130. Any suitable point of sale terminal may be used, including device (e.g., card) readers. The device readers may include any suitable contact or contactless mode of operation. For example, exemplary card readers can include RF (radio frequency) antennas, magnetic stripe readers, etc., to interact with the FIPPD 130.

As noted, a desirable element of the standard electronic payment transaction system is the entity responsible for the account management functions involved in the transaction. Such an entity may be responsible for ensuring that a user is authorized to conduct the transaction (via an on-line issuer validation by issuer 170 such as issuer 170 authentication), confirm the identity of a party to a transaction (via receipt of a personal identification number), confirm a sufficient balance or credit line to permit a purchase, and reconcile the amount of purchase with the user's account (via entering a record of the transaction amount, date, etc.). Also, such an entity may perform certain transit related services in addition to the standard transaction services.

For example, the payment transaction processing entity may be responsible for communicating with one or more transit agency computer systems to provide authentication data (by generating and/or distributing keys) for control of access to transit systems, process data obtained from a transit user's mobile device to associate transit system user identification data with an account used to pay for the transit expenses, generate billing records for transit activities, etc. Note that a trusted third party may also perform some or all of these functions, and in that manner act as a clearinghouse for access control data and/or transit activity data processing.

Figure 2:
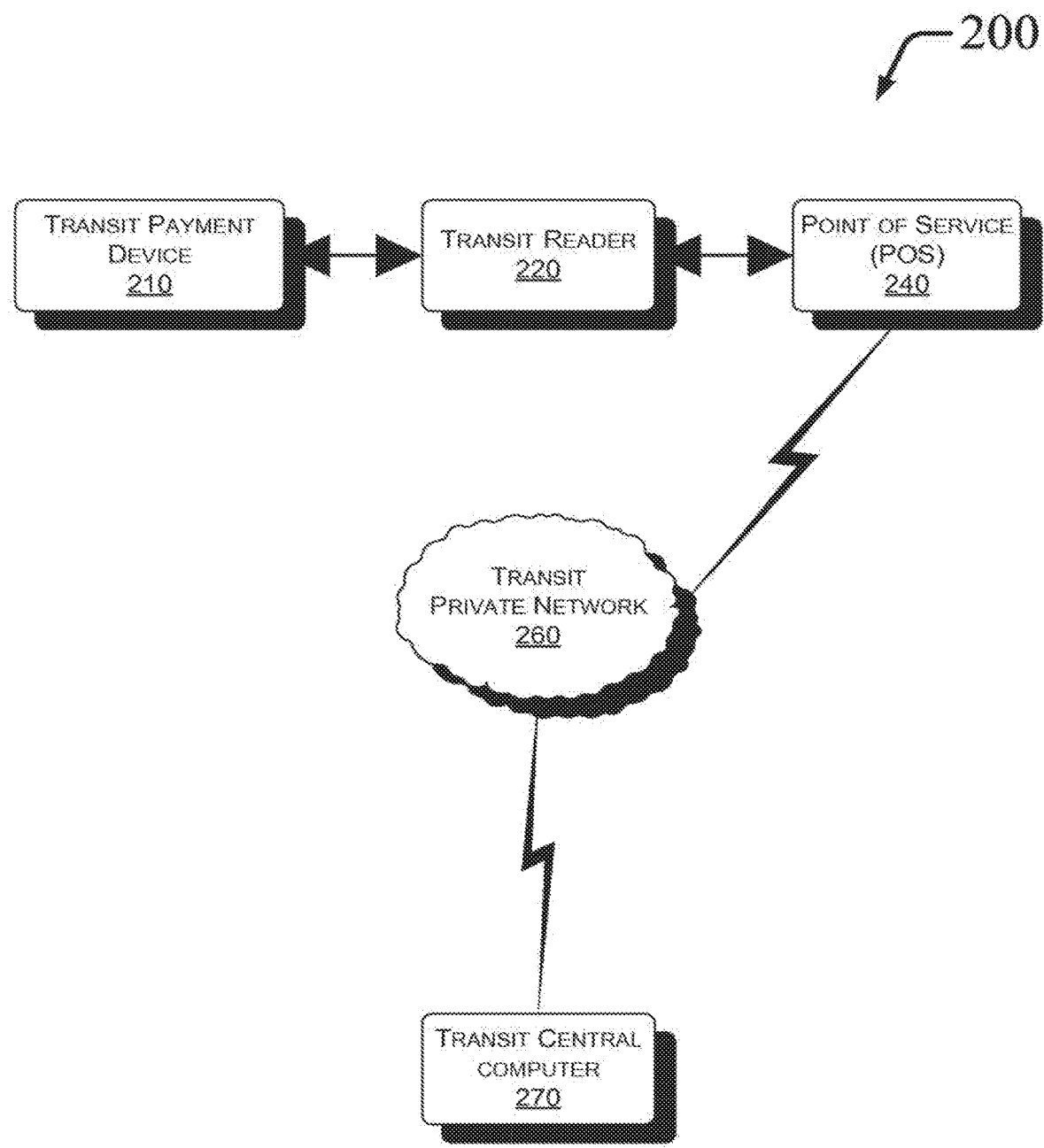
FIG. 2 is a block level diagram illustrating an exemplary closed transit processing system.

Referring now to FIG. 2, transit fare collection is typically accomplished in a closed transit processing system 200—the transit portable payment device 210 being issued by the transit system and the fare being calculated at the transit POS 240. The transit POS 240 may be a fare box or a turnstile with a transit system reader 220, such as a contactless card reader. The transit POS 240 collects and stores data such as the card identification number, card transaction history, card validity information, etc. The transit POS 240 and the transit portable payment device 210 validate each other, typically utilizing encryption algorithms and keys. The transit POS 240 then requests the data from the transit portable payment device 210. The transit reader 220 and transit POS 240 process the data from the transit reader 220 and apply the fare policy rules for the transit agency. Processing of the fare rules will result in a determination of a fare value, followed by the decreasing from the transit portable payment device 210 of value or number of rides, or application of a pass (like a monthly pass.) The transit portable payment device 210 is updated through writing information back to the transit portable payment device 210 as necessary to document the transaction on the transit portable payment device 210.

If one transaction has an impact on the cost of the next transaction, as in the case of a discounted transfer when the patron transfers to the next leg of the journey, the appropriate transit portable payment device 210 history is available at the time of the transfer transaction. The information stored on the transit portable payment device 210 is available to make determination of the cost of the fare at the moment of the transaction. There is no need to query any other computers or servers to complete the transaction at the fare device and the rider is allowed to enter the access facility.

Figure 3:
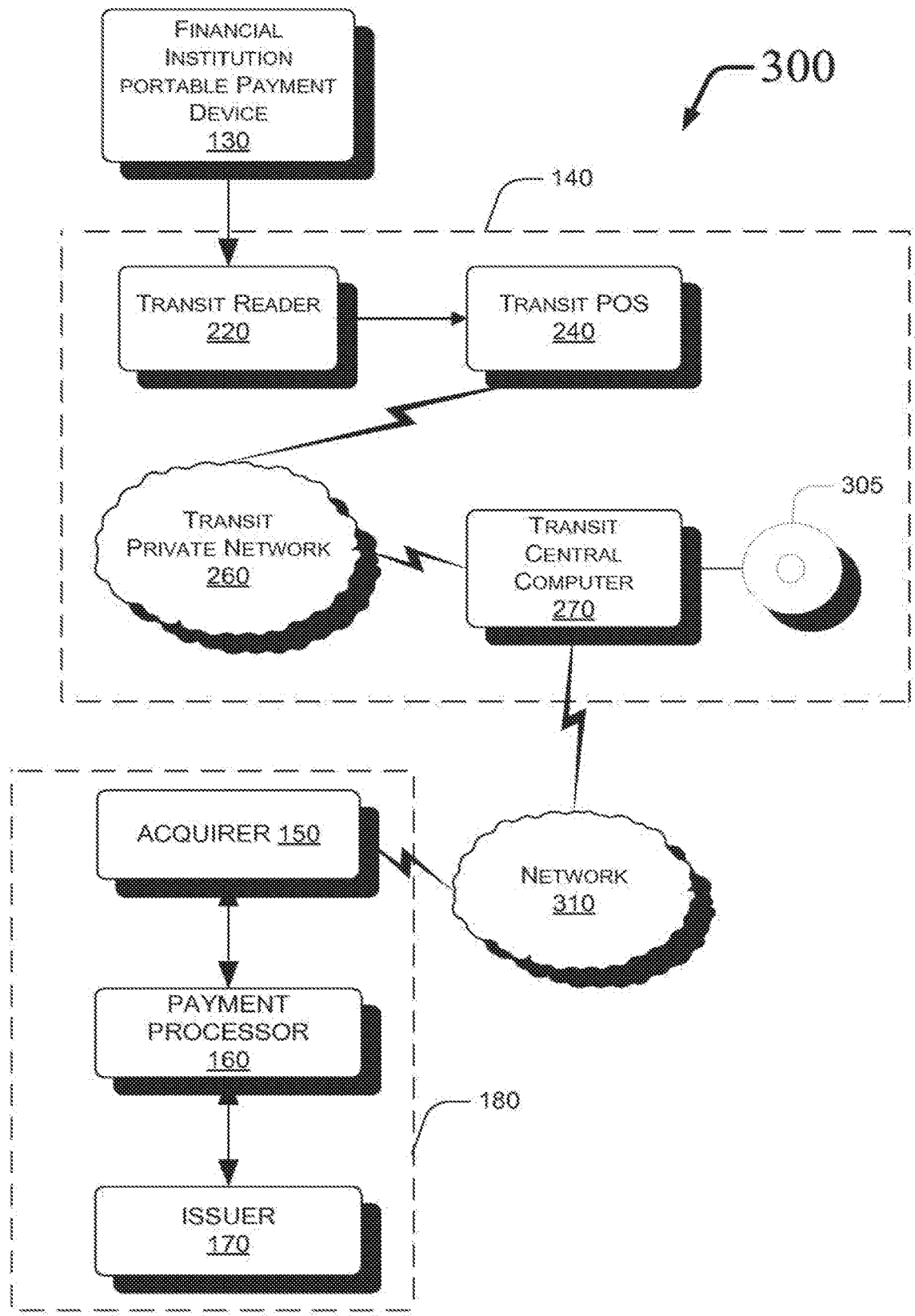
FIG. 3 is a block level diagram illustrating an exemplary open transit processing system which is compatible with the payment processing system seen in FIG. 1.

After the transaction is complete, the fare transaction information is typically transferred to transit central computer 270 via the transit private network 260 for purposes of accounting, reporting, and fraud determination. Transit portable payment device 210 is uniquely identified by a transit account number, and is tracked for out of balance values, velocity, or use-rules. If the fraud rules are broken and the transit, portable contactless device 210 is determined to have associated fraud, the transit portable payment device 210 number may be placed on a negative or positive list that may be kept in a storage that is accessible to the transit central computer, such as is seen in FIG. 3 at reference number 305 and described below. The hot list may be sent to each transit POS 240 for use as a validation component at the time of the transaction. For example, the transit portable payment device 210 identification number is found on the hot list, the transit portable payment device 210 may be denied for entry into the transit system.

Referring now to FIG. 3, a FIPPD 130 can be used in a scheme to conduct a transaction within an open access system 300. Implementation of an access fare application does not allow the opportunity for the payment transaction to go on-line to the issuer 170 for an issuer validation (e.g., authorization) at the time of the transaction as would occur with the merchant 140, such as a retail merchant. This is due in part to the need to process a transaction in less than a second, typically within about 300 ms—a transit system industry standard, to allow 30 to 45 patrons per minute into the transit facility (hereafter referred to as the "access period"). The ability to go on-line in the transit environment may also be problematic because of the lack of real time communication and network systems. For example, buses are on the road and may not have wireless or other communication systems to allow real-time dialogue with any other systems outside of the bus. Consequently, one implementation combines a scheme of processes to conduct a fare transaction, such as has been illustrated in FIG. 3.

For example, a rider may present the FIPPD 130 at the transit POS having the transit reader 220. The transit reader 220 can capture from the FIPPD 130 financial institution account information, such as Magnetic Stripe Data (MSD), in an off-line mode (e.g., without communicating with the payment processing system 180). The transit reader 220 may read all of a track data, or just part of the track data such as a primary account number (PAN) associated with the FIPPD 130. The track data, along with other transaction information, such as the time of day and the location of the transit POS 240, can be transmitted to the transit central computer 270 via the transit private network 260. At this point, however, the fare value may not be known. Nevertheless, the consumer is given access to the transit facility.

The transaction information can be stored and analyzed at the transit central computer 320. The transit central computer 320 may have a database containing transit transaction history for all riders that use the transit system. The transit transaction history can be updated with each FIPPD 130 usage at the transit POS 240 or it may be updated on a batch basis.

The transit transaction history may be accessed to calculate the value of a fare off-line. For example, a set of the transit transaction history within the database can be accessed based on the PAN read from the FIPPD 130 at each transit event (e.g., entry, transfer, or exit) using the FIPPD 130; the transit transaction history may then be put into a chronological order of transit events; and the transit fare can be derived using the chronology of transit events on the basis of predetermined transit agency rules and policies.

Once the fare value is derived, the transaction can be processed in communication with the payment processing system 180 as would a standard on-line retail transaction with the merchant 140. The fare value can be transmitted to the payment processing system 180 via the on-line network 310. Once transmitted, the fare value can be authorized, cleared and settled—as described for the payment system 100—with the merchant 140.

Figure 4:
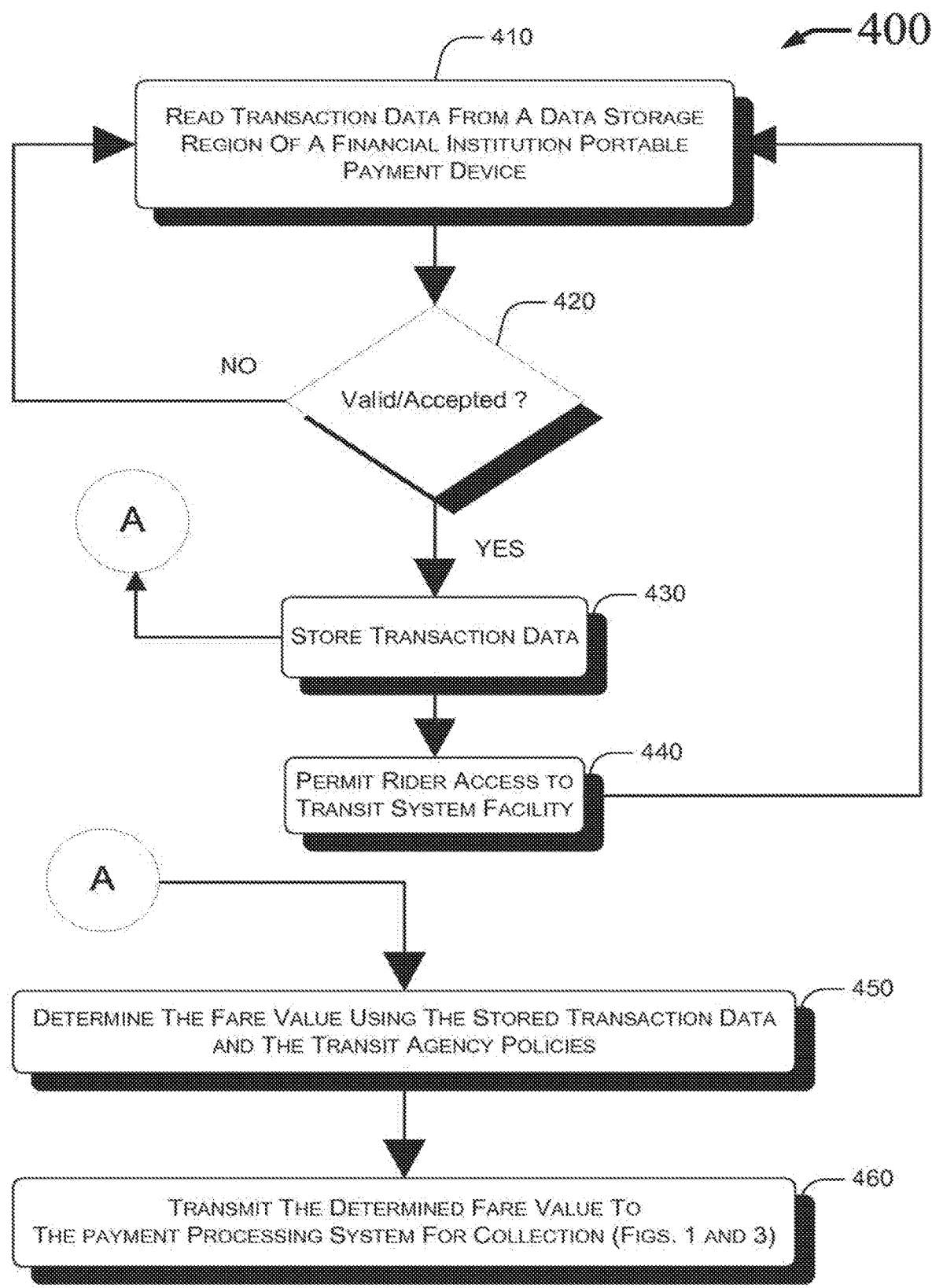
FIG. 4 is a flow chart illustrating an exemplary process through which a financial institution portable payment device can be used in the environment of the open transit processing system illustrated in FIG. 3.

Referring to FIG. 4, a flow chart is used to illustrate an exemplary process 400 through which the FIPPD 130 can be used in the open transit system 300. Process 400 begins at step 402 where data from the data storage region of the FIPPD 130 associated with an account within the payment system 100 is read. The data can include all of the track data or subcomponent thereof. For example, the data can include an identification for the FIPPD associated with the account such as the PAN. The data can be read by the transit reader 220 such as a contactless reader reading a contactless payment card that has been issued by an issuer in a payment processing system. The transaction data can include the data read at the transit reader 220 along with other transaction information such as the date, the time of day, a merchant identification code, the location of the transit POS 240, etc.

At step 420, optional validation request can be conducted at the transit POS 240 including rudimentary checks on the status of the FIPPD 130 or a variations of on-line issuer validation (e.g., authorization) with the payment processing system 180. For example, a transit validation can be requested, for instance, by examining the expiration date of the FIPPD 130 at the transit POS 240. Also, a Modulus 10 analysis can be done at the transit POS 240 wherein a checksum formula is used to validate an identification number such as the PAN.

Alternatively, or in combination, the validation step 420 may include a check against the transit agency's white list or black list maintained either at the transit POS 240 or at the transit central computer 270 to determine if the rider should be permitted access into the transit facility. The white list may be a list of data such as a hashed PAN associated with an eligible account that can be used to gain access to the transit facility. Similarly, the black list, may be a list of data associated with an ineligible account, such a hashed signature that cannot be used to gain access to the transit facility. Therefore, the white list or black list may consist of identifiers for portable payment devices, such as the PAN associated to the FIPPD 130 or a proxy thereof. The transit agency may place a portable payment device on such a list (e.g., white or black) based on various parameters. For example, the portable payment device may have been reported stolen by a consumer, the portable payment device may have been a stored value card that has exhausted its value, or the portable payment device may have been used in a repeated fashion over a course of a day such that fraud may be suspected. Stated otherwise, the "velocity" with which the portable payment device is detected as having been used may indicate that fraud is being used to gain access to a transit facility; a transit agency may have a host of policies and rules that, when transgressed, place a portable payment device on the negative list. Each such list may be kept in the database 305 in communication with transit central computer 270 or at the transit POS 240.

The transit agency may also place a consumer device on a white list or black list based on a transmission originating from the payment processing system 180, such as a response to an issuer validation request. For example, the transmission may have included a notification from the issuer 170 that there has been a declined transaction involving the FIPPD 130 in the past or that the payment processing system's 180 risk assessment on the FIPPD 130, the transit system may use compared to the risk assessment to a transit toleration threshold for risk such that the transit agency may wish to place the FIPPD 130 on the negative list if the threshold is transgressed. Other responses to the issuer validation request may be a balance check response, a credit score response, an authorization response, or a combination thereof.

The white list or black list can be hosted at the transit POS 240 or at the database 305 in communication with the transit central computer 270, while still being in communication with the transit POS 240. When the list is hosted at the database 305, the white list, or black list can be updated without, having to make changes at each transit POS 240. The transit central computer 270 need not be a single computer. Rather, the transit central computer 270 may be a network of computers such as a network with nodes for a set of transit readers 220. The nodes may be connected to each other, either laterally and/or hierarchically.

At step 430, the transaction data can be transmitted to the transit central computer 270 for storage and analysis. The transit central computer 270 may use database 305 to contain transit transaction history for riders that use the transit system over time. The transit transaction history can include transaction information such as the date and time of a transit event, an identification of the transit POS 240, an identification of the transit agency, and at least some of the data read from the data storage region of the FIPPD 130. The transit transaction history can be updated with each FIPPD 130 event at the transit reader 220 or on a batch basis.

At step 440, the rider is given access to the transit facility. The transit facility may be a subway, a bus, a ferry, a trolley, a hover craft, a train, and other forms of transportation as are typically found within a transit system. Steps 410 to 440 may occur off-line within a short period of time such as less than about one second or over a period of time not exceeding the access period (e.g., 300 ms). Steps 410 through 440 repeat as respective riders interact with the transit POS 240.

At step 450, the transit transaction history stored in step 430 may be accessed to calculate off-line (e.g., not in real time) the value of a fare using the stored transaction data and the transit agency policies. For example, a set of the transit transactions can be accessed based on the FIPPD 130 identification information, such as the FIPPD's 130 PAN; the set of transit transactions may then be ordered chronologically by transit events (e.g., entry, transfer, or exit); and the transit fare can be derived using the chronology of transit events based on predetermined transit agency rules and policies. For example, a transit agency may charge a transit fee based on predetermined fare policies, such as a flat fee of $2.00 (U.S.) for entry into the system. Other examples of predetermined fare policies include evaluating the fare value based on: an entry into the facility of the transit system; an exit from the facility of the transit system; a distance for one entry and a corresponding exit; a transfer from one facility of the transit system to another facility of the transit system; the sequential number of each transfer in a predetermined time period; a direction of travel in the transit system; a classification of the rider corresponding to the FIPPD 130 (e.g., concessions based on age, student status, or frequent ridership); peak and off peak travel time periods; a calendar holiday travel time period; and combinations of the foregoing. Those in the art are familiar with the potential rules and policies that may apply in calculating a transit fare.

Sometimes several FIPPDs 130 may have the same PAN. For example, a husband and wife may each have their respective FIPPDs 130 linked to their joint checking account. Alternatively, several employees of the same employer may each have respective FIPPDs 130 all being associated with a single account (e.g.; PAN) within the payment processing system 180. As such, the respective fare calculations for those employees using their respective FIPPDs 130 to commute during the same time within the transit system will need to take into consideration which card is being used by each employee within the same PAN.

At step 460, the transit agency may transmit one of more calculated fare values to the payment processing system 180 for collection based on various payment models. For example, the model used by the transit agency to request payment for the calculated fare values from the payment processing system 180 may be a pay per each use model, an aggregation of multiple calculated fare values model, or a pre-paid model.

In the pay per each use model when the transit fare is determined the fare is transmitted to the payment processing system 180 for collection. Therefore, the transit fare may be directly sent to the payment processing system 180. Alternatively, the calculated transit fare may be batched with other calculated transit fares for a plurality of FIPPDs 130 over a period of time and then sent on an intermittent basis to the payment processing system 180 for collection.

Once the transit fare is sent to the payment processing system 180 it can be processed according to typical protocol for merchants 140. For example, each $2.00 transit fare can be authorized, settled, and cleared through the payment processing system 180, the transit agency can he paid, and the consumer can receive the assessed transit fare(s) in a monthly statement corresponding to their PAN.

In the aggregation model, the transit fare involving FIPPD 130 may be accumulated based on a predetermined algorithm prior to sending the transit fare to the payment processing system 180. The cumulated transit fares may be over time, over transit value, or over quantity. For example, the transit agency may accumulate transit fares involving the FIPPD 130 that occur over a week period prior to transmitting the aggregate set of fares to the payment processing system 180. Alternatively, the transit agency may accumulate transit fare values based on a threshold value. For example, once the accumulated transit fare value reaches $20.00 (U.S. dollars), the transit agency may transmit the aggregated set of fares to the payment processing system 180. In another example, the transit agency may accumulate the transit fare values based on the quantity of transit fares—such as when a rider has completed five (5) rides involving the same FIPPD 130 where each ride had its own fare value (e.g., $4.00, $0.50, $1.00, and $5.00 U.S. dollars), and then accumulate the fares and transmit the total value thereof to the payment processing system 180.

In the stored value model, the account associated with the FIPPD 130 is accessed through the payment processing system 180 at the transit system. For example, the rider can ask the transit agent at a payment booth to deduct an amount from the rider's credit card associated with the payment processing system 180 prior to the rider going to a turnstile to seek entry into a subway of the transit system. The transit agent may then conduct an on-line transaction with the payment processing system 180 so as to charge a value against the account, for example $50.00 (U.S. dollars). The transit system can then maintain a transit account associated with the FIPPD 130, for example, such that the transit account may be maintained at the transit central computer 270. When the rider wishes to take the subway, the rider may go to the turnstile, bring up the FIPPD 130 in proximity to the transit reader 220 in a contactless reading operation. The transit POS 240, in this case the turnstile, may transmit the transit event to the transit central computer 270 via the transit private network 260. Once a plurality of such transit events are completed for the PAN associated with FIPPF 130 (such as both an entry and an exit to the subway system for the rider), the transit fare can be calculated and deducted from the transit account at the transit central computer 270. In this case, the on-line transaction to record the transit event occurs before the off-line transaction of the transit central computer 270 to collect the aggregated set of fares from the payment, system 180.

The rider may set up the transit account such that the account is "topped off" at predetermined intervals—such as when the end of the month arrives or when the transit account has reached a threshold lowest value such as $5.00 (U.S. dollars), whereby a predetermined amount is charged to the account that is associated with the FIPPD 130 in the payment processing system 180 Therefore, the transit system may conduct an on-line transaction, for example for $50.00 (U.S. dollars) with the payment processing system 180 once the predetermined interval is reached.

It should be understood that the present invention can be implemented in the form of control logic, in a modular or integrated manner, using software, hardware or a combination of both. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
    storing, on a storage region of a first financial institution portable payment device (FIPPD), financial institution account information and rider transaction history data, wherein the first financial institution portable payment device is issued by a financial institution, wherein the first financial institution portable payment device is configured to perform a transit transaction and a non-transit transaction;
    sending, by the first financial institution portable payment device to a first transit point of service (POS) terminal while the first financial institution portable payment device is offline, data including financial institution account information, wherein the financial institution account information identifies the first financial institution portable payment device, wherein the sending is performed in response to the first financial institution portable payment device being authorized to communicate with the first transit POS terminal;
    storing, on the storage region of the first financial institution portable payment device, entrance transit information associated with a first interaction between the first financial institution portable payment device and the first transit point of service (POS) terminal of a transit facility in order to conduct a transaction;
    sending, by the first financial institution portable payment device to a second transit point of service (POS) terminal, exit transit information associated with a second interaction between the first financial institution portable payment device and the second transit point of service (POS) terminal of the transit facility; and
    updating, by the first financial institution portable payment device, the financial institution account information and the rider transaction history data stored on the storage region of the first financial institution portable payment device.

2. The method according to claim 1, wherein the first financial institution portable payment device is issued by the financial institution.

3. The method according to claim 1, wherein the first financial institution portable payment device is configured to conduct a retail transaction.

4. The method according to claim 1, wherein the entrance transit information comprises a first time of day information and a first location information of the first transit POS terminal; and
    wherein the exit transit information comprises a second time of day information and a second location information of the second transit POS terminal.

5. The method according to claim 1, wherein the first financial institution portable payment device is associated with a primary account number (PAN) of a payment account.

6. The method according to claim 1, the first financial institution portable payment device is determined to be authorized to communicate with the first transit POS terminal based on a checksum operation validating an account identification number of the first financial institution portable payment device.

7. The method according to claim 1, wherein the first financial institution portable payment device and a second financial institution portable payment device are associated with a single payment account.

8. The method according to claim 1, wherein the first financial institution portable payment device is configured to access a plurality of different transit agencies.

9. The method according to claim 1, wherein the first financial institution portable payment device is a contactless payment device that is configured to communicate with the first transit POS terminal and the second transit POS terminal using radio frequency technology.

10. The method according to claim 1, and wherein the first financial institution portable payment device is on a white list of a transit agency.

11. The method according to claim 1, and wherein the first financial institution portable payment device is configured to securely store financial institution account identification information identifying a payment account of a user of the first financial institution portable payment device.

12. A first financial institution portable payment device (FIPPD) comprising:
    one or more processors and a memory, wherein the one or more processors are configured to:

store, on a storage region of the first financial institution portable payment device, financial institution account information and rider transaction history data, wherein the first financial institution portable payment device is issued by a financial institution;

send to a first transit point of service (POS) terminal while the first financial institution portable payment device is offline, data including financial institution account information, wherein the financial institution account information identifies the first financial institution portable payment device, wherein the sending is performed in response to the first financial institution portable payment device being authorized to communicate with the first transit POS terminal;

store, on the storage region of the first financial institution portable payment device, entrance transit information associated with a first interaction between the first financial institution portable payment device and the first transit point of service (POS) terminal of a transit facility in order to conduct a transaction;

send to a second transit point of service (POS) terminal, exit transit information associated with a second interaction between the first financial institution portable payment device and the second transit point of service (POS) terminal of the transit facility; and update the financial institution account information and the rider transaction history data stored on the storage region of the first financial institution portable payment device.

13. The first financial institution portable payment device according to claim 12, wherein the first financial institution portable payment device is issued by the financial institution.

14. The first financial institution portable payment device according to claim 12, wherein the first financial institution portable payment device is determined to be authorized to communicate with the first transit POS terminal based on a checksum operation validating an account identification number of the first financial institution portable payment device.

15. The first financial institution portable payment device according to claim 12, wherein the first financial institution portable payment device is a contactless payment device that is configured to communicate with the first transit POS terminal and the second transit POS terminal using radio frequency technology.

16. A non-transitory computer readable medium including instructions configured to cause one or more processors to perform operations comprising:

storing, on a storage region of a first financial institution portable payment device (FIPPD), financial institution account information and rider transaction history data, wherein the first financial institution portable payment device is issued by a financial institution;

sending, by the first financial institution portable payment device to a first transit point of service (POS) terminal while the first financial institution portable payment device is offline, data including financial institution account information, wherein the financial institution account information identifies the first financial institution portable payment device, wherein the sending is performed in response to the first financial institution portable payment device being authorized to communicate with the first transit POS terminal;

storing, on the storage region of the first financial institution portable payment device, entrance transit information associated with a first interaction between the first financial institution portable payment device and the first transit point of service (POS) terminal of a transit facility in order to conduct a transaction;

sending, by the first financial institution portable payment device to a second transit point of service (POS) terminal, exit transit information associated with a second interaction between the first financial institution portable payment device and the second transit point of service (POS) terminal of the transit facility; and updating, by the first financial institution portable payment device, the financial institution account information and the rider transaction history data stored on the storage region of the first financial institution portable payment device.

17. The non-transitory computer readable medium of claim 16, wherein the first financial institution portable payment device is issued by the financial institution.

18. The non-transitory computer readable medium of claim 16, wherein the first financial institution portable payment device is determined to be authorized to communicate with the first transit POS terminal based on a checksum operation validating an account identification number of the first financial institution portable payment device.

19. The non-transitory computer readable medium of claim 16, wherein the first financial institution portable payment device is a contactless payment device that is configured to communicate with the first transit POS terminal and the second transit POS terminal using radio frequency technology.

* * * * *